United States Patent [19]

Adams et al.

[11] Patent Number: 5,274,561
[45] Date of Patent: Dec. 28, 1993

[54] ELECTRONIC TAXIMETER WITH APPARATUS FOR ROUNDING OFF A FARE

[75] Inventors: Jürgen Adams; Norbert Lais, both of Villingen-Schwenningen, Fed. Rep. of Germany

[73] Assignee: Mannesmann Kienzle GmbH, Villingen-Schwenningen, Fed. Rep. of Germany

[21] Appl. No.: 550,166

[22] Filed: Jul. 9, 1990

[30] Foreign Application Priority Data

Jul. 7, 1989 [DE] Fed. Rep. of Germany ....... 3922373

[51] Int. Cl.$^5$ .......................... G07B 13/04; G07B 13/08
[52] U.S. Cl. ................................. 364/467; 235/30 R; 235/33; 377/20; 377/24.1
[58] Field of Search ................ 235/30 R, 33, 45; 364/467; 377/20, 24.1

[56] References Cited

U.S. PATENT DOCUMENTS

| | | | |
|---|---|---|---|
| 3,843,874 | 10/1974 | Kelch | 364/467 |
| 3,860,806 | 1/1975 | Fichter et al. | 235/30 R X |
| 3,931,508 | 1/1976 | Kelch | 235/30 R X |
| 4,167,040 | 9/1979 | Heritier et al. | 235/30 R X |
| 4,217,484 | 8/1980 | Gerst | 235/30 A X |
| 4,570,228 | 2/1986 | Ahlberg | 377/24.1 X |
| 4,789,774 | 12/1988 | Koch et al. | 235/30 R |

*Primary Examiner*—Edward R. Cosimano
*Attorney, Agent, or Firm*—Anderson Kill Olick & Oshinsk

[57] ABSTRACT

An apparatus is described for increasing a fare to a rounded-off amount, in which the fare is determined by an electronic taximeter and prior to the preparation of a voucher in an assigned voucher printout mechanism the amount payable is rounded-off by an increase of the fare amount manually preselectable in predetermined steps, based on an actuation of operating keys. A stepwise or discretely adjustable rounding-off is selectable for printout in the voucher printer in such a way that the voucher shows the sum, formed from the fare+surcharge+additional amount selected by the passenger.

19 Claims, 5 Drawing Sheets

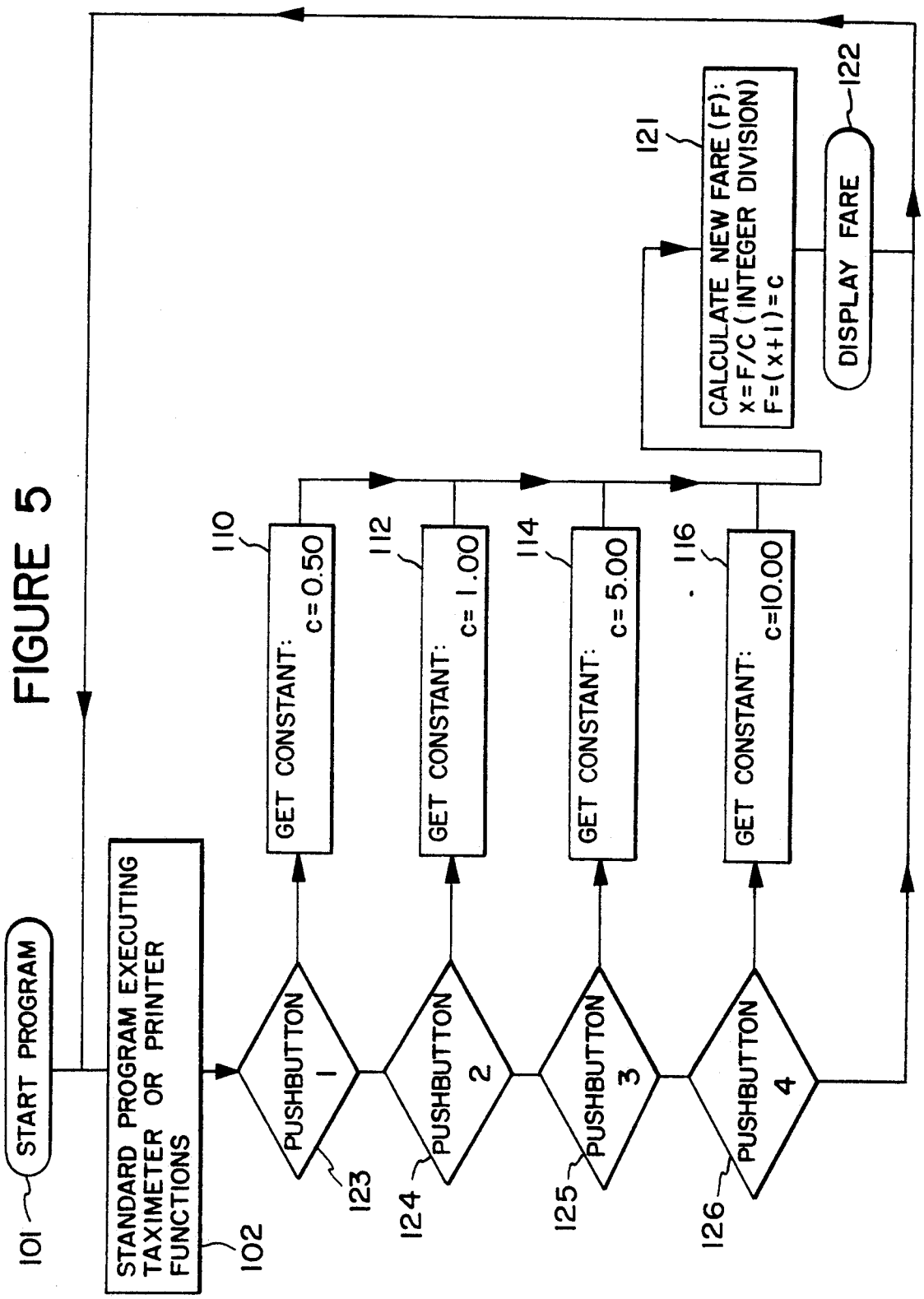

ELECTRONIC TAXIMETER WITH APPARATUS FOR ROUNDING OFF A FARE

The invention is directed to an apparatus for increasing of a fare to a rounded-off amount, especially for use in a voucher or receipt printer in cooperation with an electronic taximeter.

BACKGROUND OF THE INVENTION

In the operation of a taxicab, the use of a taximeter for determination of the distances traveled with fare paying clients and of the fare paid for this is indispensible. A high percentage of passengers use the taxicab for business travel, which as a rule is subsequently reimbursed, and which therefore require the presentation of a voucher or recept showing the fares. The simplest way of issuing a voucher or receipt is by manual insertion of a fare agreed to with the passenger into a voucher preprinted with certain standard data. Vouchers issued in this fashion use up valuable time and can be manipulated in a random manner especially as the fare data are concerned. In order to facilitate an issuance of vouchers and at the same time create a basis for accurate accounting, a voucher printer is assigned to the taxi microcomputer, which with the help of a simply operable keyboard issues a voucher for the passenger through actuation of a key. The voucher printers presently in use however only prepare vouchers showing the fare determined by the taximeter and transmitted to the printer. The widespread usage of rounding the fare shown on the taximeter upward with the intent to include for the driver a proper "tip" as a surcharge, cannot be transmitted to the printed voucher. Because of this, the use of such printed vouchers is not very popular with taxi drivers. In addition, the passenger has no option to obtain a refund of a "tip" of a normal amount possibly by a fare rounded-off upwards also in tariff areas, where the use of a voucher printer is mandatory, not leastly for protection against inflated vouchers, when settling expense accounts.

SUMMARY OF THE INVENTION

It is an object of the invention to provide an apparatus of the previously described type, which performs a controlled rounding-off (increase) of the fare amount determined by the taximeter and makes it available for subsequent appropriate print-out upon a voucher or receipt.

In accordance with a principal aspect of the invention, the apparatus is provided with means for allowing the taxi operator or user to determine the rounded-off amount to be added to the fare to serve, for instance, as a tip or gratuity to the operator and which will be printed-out on the voucher handed to the passenger. In a preferred embodiment, the increase occurs by way of predetermined steps, and thus the values printed on the receipt can be modified to include separately or in total the amount of the increase selected.

The introduction of this so-designated round-off function for voucher printers is of particular advantage in the mandatory use or in connection with a mandatory installation of a voucher printer. Only this allows, for instance, a taxi operator to hand the passenger a voucher showing the entire fare costs, namely the sum of the fare plus any additional payments. In addition to receipting the actually paid fare costs, this arrangement assures in addition a rapid and accurate preparation of a voucher with all additional information required, as for instance date, vehicle identity, tour number and the like, which in the conventional way had to be inserted manually on each individual receipt voucher thus consuming considerable time.

Several different methods can be used for designing the stepwise raising of the fare. For this purpose, a computational method can be developed which regulates the raising of the amount agreed to by the passenger by means of a step additive rounding-off in a known predetermined step sequence, without any further steps needed during the input of a rounding-off operation.

The various features of novelty which characterize the invention are pointed out with particularity in the claims annexed to and forming a part of this disclosure. For a better understandisg of the invention, its operating advantages and specific objects attained by its use, reference should be had to the accompanying drawings and descriptive matter in which there are illustrated and described the preferred embodiments of the invention.

BRIEF DESCRIPTION OF THE DRAWINGS

In the drawings:

FIG. 5 is a flow diagram further illustrating yet another version of the flow diagram of FIG. 3.

DETAILED DESCRIPTION OF THE PREFERRED EMBODIMENTS

Figure 1:
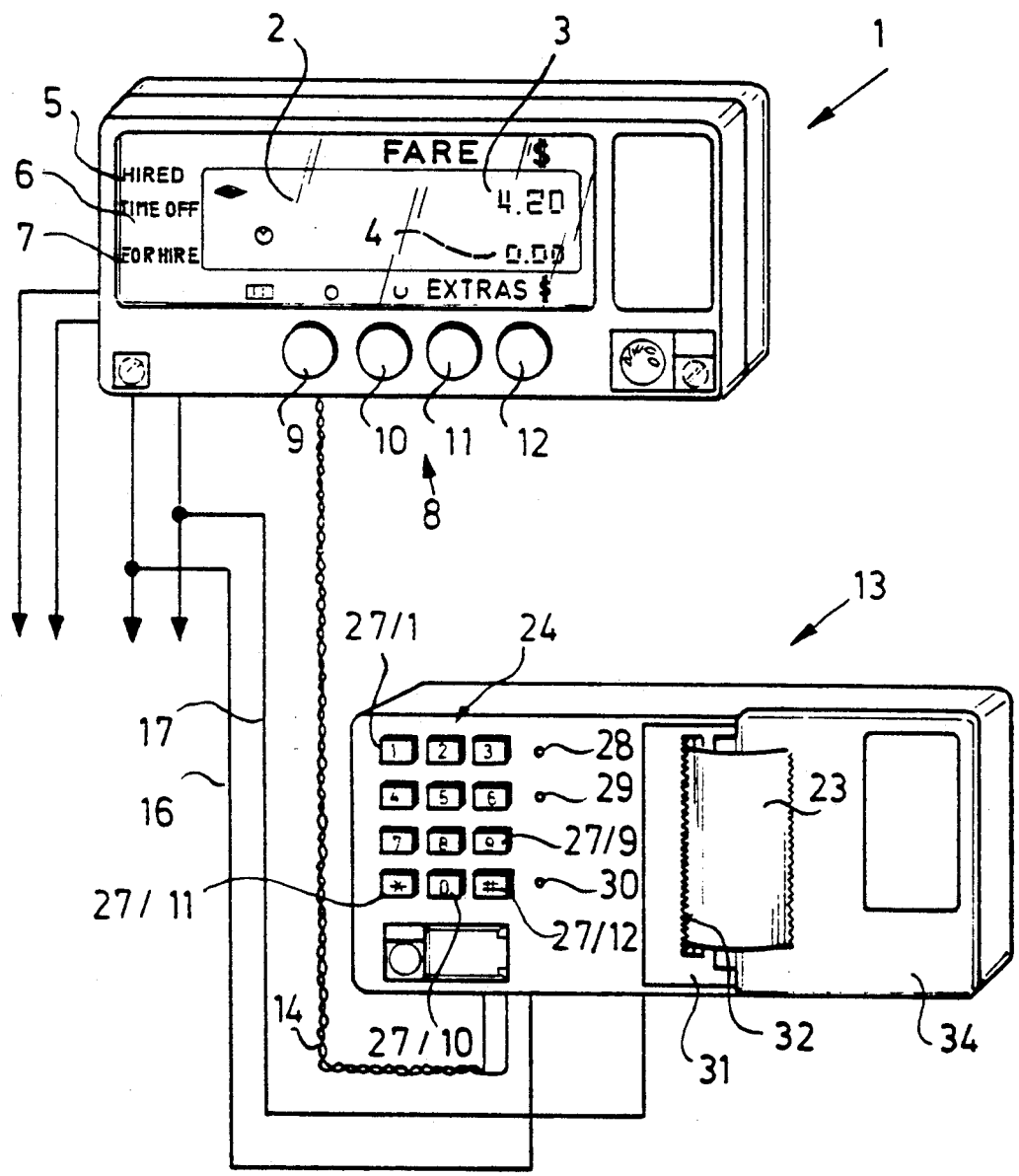
FIG. 1 shows, schematically, a minicomputer-controlled taximeter in combination with a voucher printer connected therewith through lines.
Figure 2:
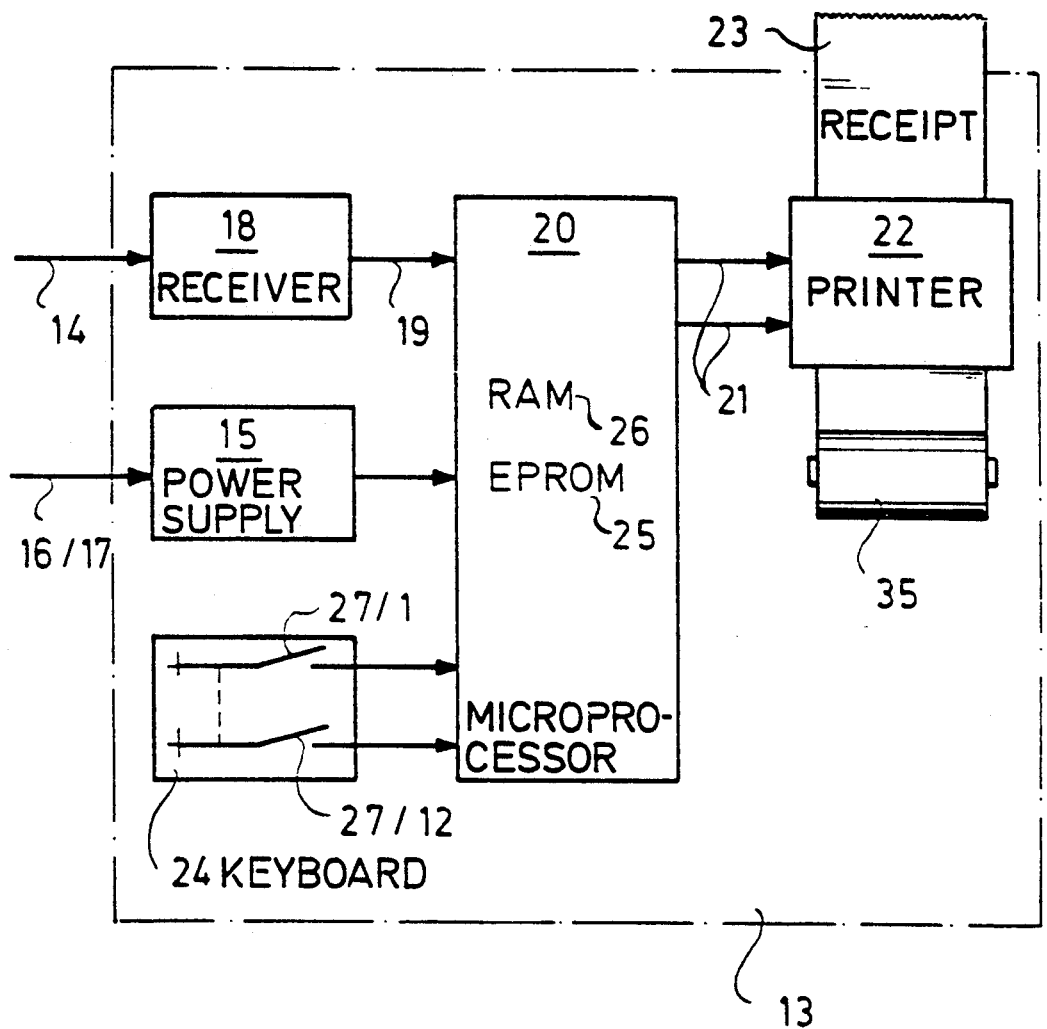
FIG. 2 shows a diagrammatic block circuit diagram of the voucher printer including the input interfaces.

The taxi minicomputer 1 shown in FIG. 1 fulfills the known purpose, of continuously determining and displaying the fare based on distance and time elements by means of recomputing in a microcomputer on the basis of previously stored tariff data parameters. See, for example, U.S. Pat. Nos. 3,843,874; 3,860,806; 3,931,508; and 4,167,040, whose contents are incorporated herein. All internal functions are controlled centrally by a microprocessor and the computed data are displayed on a liquid crystal display 2. In normal operation the display 2 shows a fare 3, a surcharge 4, a functional symbol with respect to the switched-on taxi steps 5, cash 6 or free-position 7. In addition symbols and digits not described in detail here are provided in the multi-functional display, which essentially deal with a special function or possibly with a malfunction indication. The manually actuatable operating elements 8 consists in the example shown in FIG. 1 of four function-keys 9, 10, 11, 12, which fulfill a double function, firstly for the taxi operation and secondly for the inspection or verification operation. It should be pointed out as far as key 11 is concerned that, when it is operated, the overall sum consisting of fare 3 plus surcharge 4 can be formed and displayed and therein subsequently by means of sum separation the previous individual amounts can again be displayed by overlaying or superposed separately those amounts.

Essential in connection with the subject of the application are the arrangement of the interfaces in the taxi microcomputer 1, forming the basis for expansion possibilities, for instance for connecting of peripheral equipment and, as shown in the present case, of a printer 13. For operating the printer 13, for example, the tariff and travel data as well as the control counter data are available at an interface of the microcomputer 1 for serial transmission and are transmitted through signal lines 14 to the printer 13. For this purpose the printer 13 has a receiver 18 as an input interface, whose data input comprises measures against possibly occurring feedback for interaction to the taxi microcomputer 1. The electrical separation required for this has been realized by an optocoupler. Signal data are directed through information lines 19 to a microprocessor 20 from the output side of the receiver 18, where they are processed through internal processes by logic, RAM and PROM and are conducted on the output side through data lines 21 to a printout mechanism 22. The printout mechanism 22 finally prepares on call a voucher 23 for the passenger showing the fare costs. It is however possible in addition to print different printouts, such as credit vouchers, shift final accounting, trip protocols. The printer 13 represents a complete unit and comprises a keyboard 24 integrated into the printer housing, a program memory (EPROM) 25 and a data memory (RAM) 26. Correspondingly the control of the printer action is performed by an arrangement of twelve keys 27/1 to 27/12, which serves in addition to a triggering of functions also for input of data. An input of data into the printer 13 is only possible when the vehicle is stationary; the same applies also in that the preparation of a print-out, for instance of a receipt, is only possible when the vehicle is stationary. The printing function generally depends upon certain functional positions of the taxi minicomputer 1 delivering the actual data, in such a way that for instance vouchers are only printed out for the passengers exclusively in the operational mode "cash" of the minicomputer 1 with simultaneous actuation of a key 27/1 to 27/3 determining the type of voucher. In the operational mode "3" of the taxi minicomputer finally various protocol strips can be printed out. The call for this occurs through actuation of an appropriately assigned key 27/1 to 27/10. By means of the keys 27/1 to 27/10 digit values can be however entered, whose correct acceptance is signified by actuation of an additional key 27/11. An erroneous entry of data can be erased by actuating a key 27/12.

Three display elements 28, 29, 30 are arranged in accordance with the embodiment example in FIG. 1, which displays to the operator the operational availability of a certain operational state. The printout mechanism 22 which is conventional and is not shown in detail here is located beneath a cover 31, which conveys the printed voucher through a paper slot 33 with a tear-off edge 32. A paper storage roller 35 is located beneath a lid 34. In the drawings, reference numeral 15 represents the usual power supply for the apparatus shown, and lines 16 and 17 represent the usual connections to the vehicle generator or battery. The receipt 23 may have two segments 23/1 and 23/2, of which the first provides a detailed breakdown of the charge and the second only provides the grand total.

One example in accordance with the invention for rounding-off a fare consists in performing a rounding-off of the fare in stages by means of a manual actuation process by stepped actuation of a key 27. In this connection a practical example will be shown as to how by means of a three step rounding-off a surcharge offered by the passenger as a driver tip is entered into the printer and is thus printed out in the total sum on an expense receipt suitable for reimbursing expenses. In an example from actual practice, it is assumed that the fare is equal to DN 23.40 (in accordance with the display on the taximeter); by actuating a key in three steps there occurs a stepwise raising of the surcharge as stated below:

1. first actuation (keypress) DM 23.50 (DM 0.10 surcharge)
2. second actuation DM 24.00 (DM 0.10+0.50 surcharge)
3. third actuation DM 25.00 (DM 0.10+0.50+1.00 surcharge);

meaning that the rounding-off rules applicable in this example comprises the following process steps:

1. first actuation means: rounding off to the nearest higher DM 0.50,
2. second actuation means: rounding off to the nearest higher DM 1.00,
3. third actuation means: rounding off to the nearest higher DM 5.00.

A rounding-off of a displayed fare to a higher amount offered by the passenger is thus based on the premise of an additional payment to the taxi chauffeur predeterminable by several selectable steps and can thus also be accepted by an official organization because of the presetting mode which cannot be tampered with. Rounding-off systems can naturally be configured differently than the example indicated above to be also a function of the tariff in another system of steps or by means of a repeatable system of steps or being adjustable by means of several steps.

In another example in accordance with the invention, a rounding-off which is manually adjustable is obtained by a discrete, sequence of steps selectable for instance by means of three different keys 27/1, 27/2, 27/3. In detail, this means that, for instance, with a fare of DM 27.60 displayed in a display of the taxi microcomputer 1, the displayed amount can be increased by actuating the key 27/1 to DM 28.00 (=DM 0.40 surcharge) and can be printed out on a voucher. By the direct operation of the key 27/2 the amount of DM 27.60 is directly increased to DM 30.00 (=DM 2.40 surcharge). With the direct actuation of key 27/3 there occurs a direct increase of the displayed amount from DM 27.60 to DM 35.00 (=DM 7.40 surcharge) for the preparation of a voucher 23.

It is assumed in this variant that each key must only be operated once. In an additionally possible repeated actuation, a precautionary limitation of the number of actuations or manipulations should be included.

In the reverse direction, it is also possible to reduce an already preselected amount for printout by means of key 27/3, in the example of DM 35.00, to an amount of DM 30.00 by a subsequent actuation of key 27/2 and to legitimize this on a voucher.

The measures or process steps performable in connection with a rounding-off of the fare amount in the voucher printout mechanism can also be utilized directly in the area of the taxi microcomputer 1, where there already occurs a summation of the amounts consisting of fare+surcharge and where a rounding-off is already effective as a component of a summation and the thus determined total amount is directly printed as the amount on the voucher. The operating elements for triggering the rounding-off can then also be functionally a part of the taxi-microcomputer 1. For the handling of the rounding step, it is noted that the stepping or values of the increased amounts added can be chosen to be variable and can be incorporated into the tariff data 6 as far as its value position is concerned and thus the inclusion of a regulated surcharge can also be confirmed by official approval. Based on an interaction of process steps for rounding-off the final amount to agree with the tariff data, the rounding step can also be made a function of conditions or parameters for workday and Sunday or holiday tariffs or day or night rates and the like.

To implement the foregoing, as will be evident to those skilled in this art, requires only a simple programming of the microcomputer, in the taximeter or in the printer, to compare the actual fare against stored values representing the stepped-up amounts depending upon the number of repeat keypresses or the key actuated to achieve the desired increased surcharge. Once calculated and stored, it is straightforward to print the voucher with the surcharge added.

Figure 3:
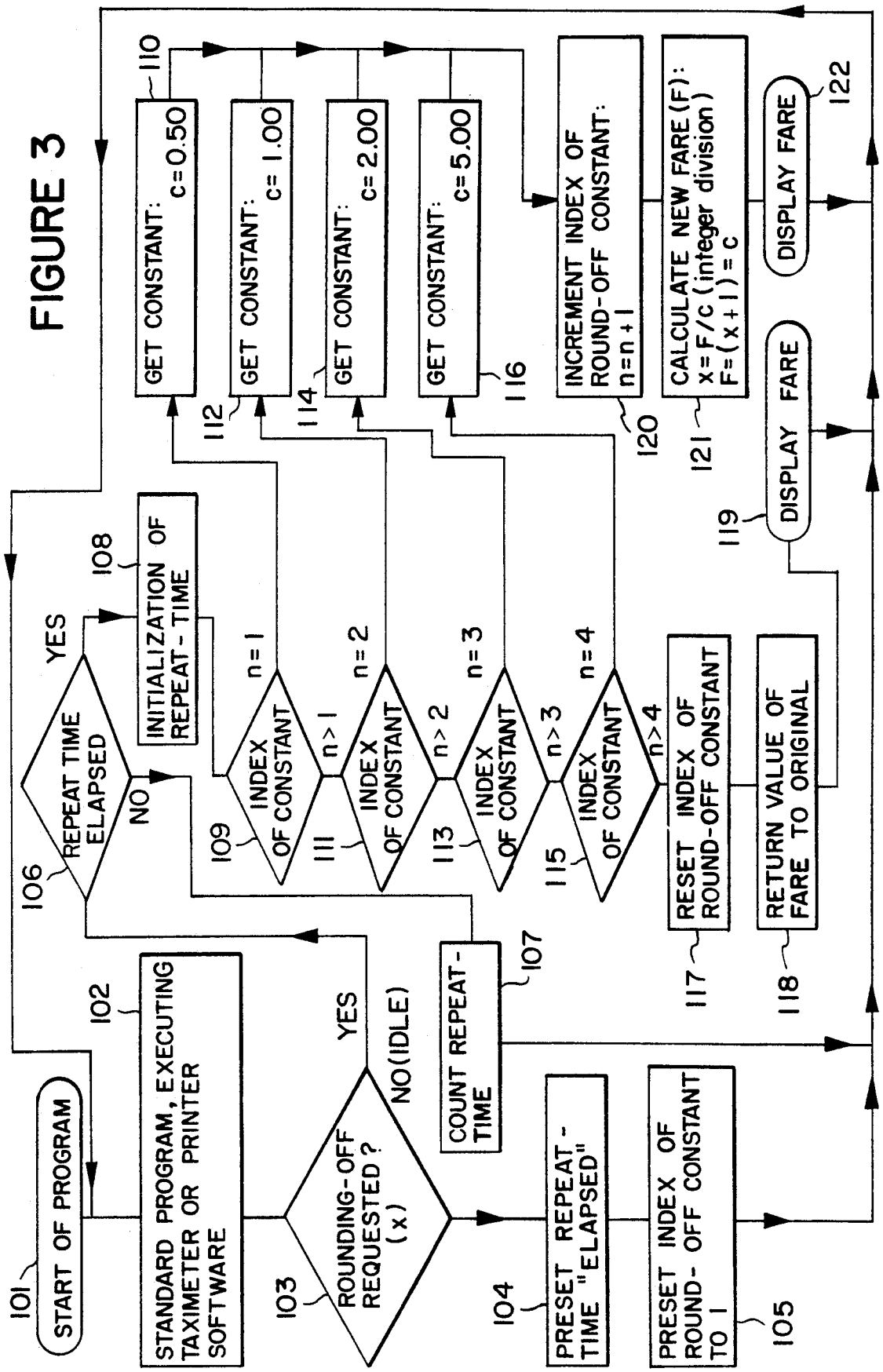
FIG. 3 is a flow diagram which illustrates a typical manner in which the present invention operates.
Figure 4:
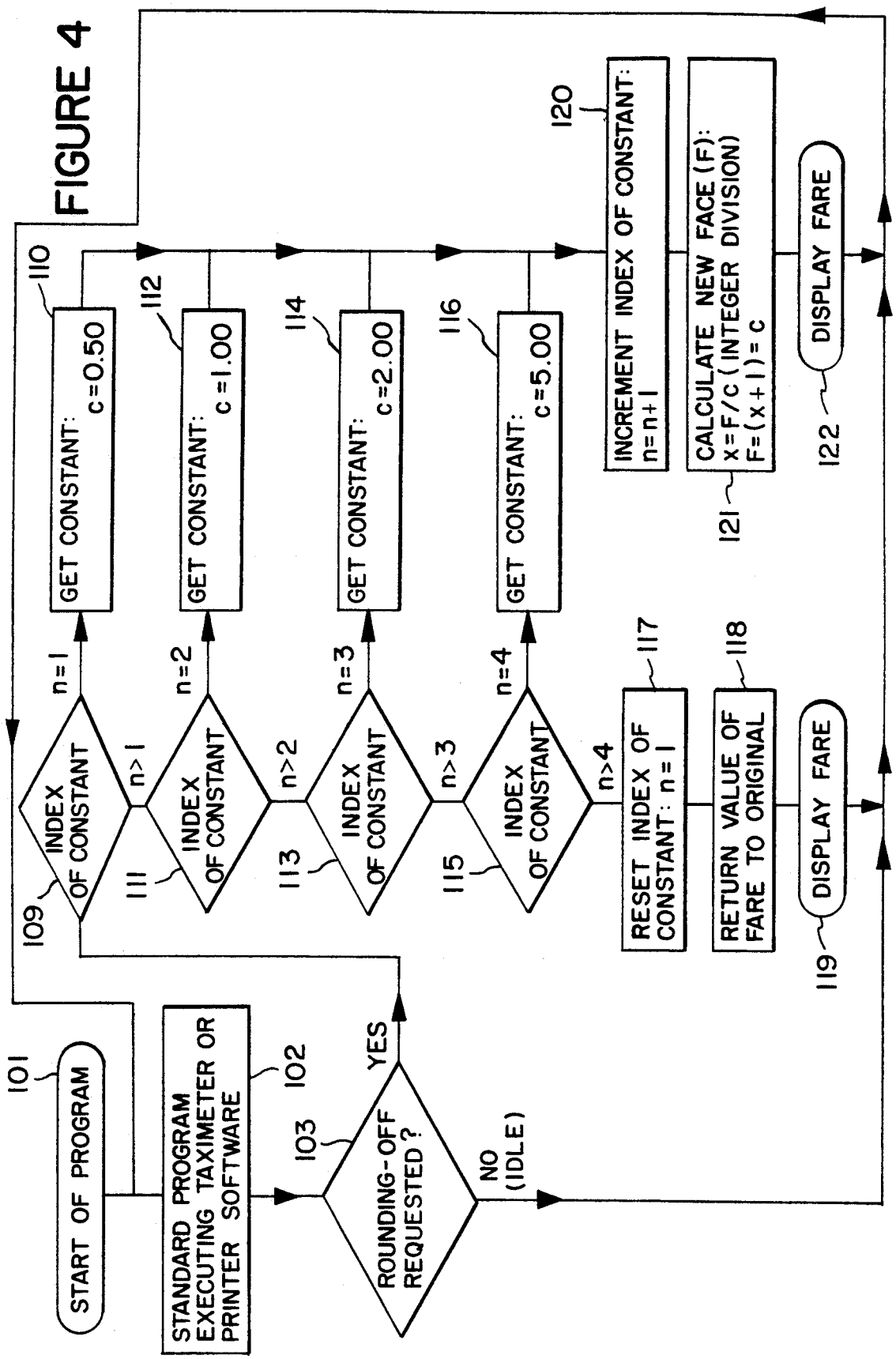
FIG. 4 is a flow diagram further illustrating a version of the flow diagram of FIG. 3.

FIGS. 3–5 show flow diagrams of three embodiments of software programs for implementing the operational process in which the rounding function, according to the invention, is used.

The program shown in FIG. 3 starts upon the starting of the taximeter, with step 101. Thereafter, the taximeter switches to a standard program 102. There, the fare, in accordance with the travel path and time, which is dependent on tariff parameters not discussed in detail here, is established. The rounding function, according to the invention, can be incorporated in the processor of the taximeter or in the processor of the printer. If the program is executed in the processor of the printer, the initial far should be transferred through the data line, from the processor of the taximeter and to the processor of the printer and be available for use thereat. The required hardware need not be discussed in detail at this stage.

The request for rounding, in the embodiment of the program shown in FIG. 3, is effected according to interrogation 103, by actuating a respective key of the keyboard 27. Dependent upon the duration of actuation of the key, which is pressed by the user, the fare is rounded stepwise.

If the rounding function is not called in, the repeat-time will be settled in step 104 to the initial value. In step 105, the rounding index, which counts the number of rounding stages, is set to 1.

In the step 106, the repeat time of step 104 is interrogated and is divided according to two program loops. As long as the repeat time does not expire, the repeat-time will be counted only in the first loop at step 107. At this time, the last counted fare is displayed. In the second loop, the stepwise rounding, according to steps 108 through 122, takes place.

In step 108, the repeat-time is superimposed on the repetition time of the following rounding step. In step 109, the initial value of the step 105 is interrogated and, with the index according to step 110, the first rounding value is established. The steps 111, 112, or 113, 114, or 115, 116 use an index, which is increased by 1, for establishing respective rounding values.

When the index reaches its end value, which corresponds to that of the example, the index value is reset to the value of the step 105 at step 117. Also, according to step 118, the original fare is provided and is displayed in step 119. The rounding is then further executed anew by a rounding request in the program stage 103.

In step 120, the index of the rounding value is increased stepwise by 1 for use in steps 109, 111, 113 and 115. In step 121, the rounded fare is issued, according to the equation $X=F/c$, wherein $F=(X+1)*c$, with the help of rounding values provided in steps 110, 112, 114 and 116. F is the usual mileage time calculation and the increased amount; c is a predetermined constant selected by the user. The result of this calculation, namely, the fare F, is displayed in step 122.

The embodiment of FIG. 4 differs from the above-described embodiment in that the repeat time is set, by actuation of a single key, with a stepwise increase of the rounding index. Upon actuation of a separate predetermined key of the keyboard 27, the fare is set to a next higher rounding stage. The execution of the operational process has already been described, with reference to its result, in detail in one example above.

FIG. 5 shows an embodiment of the rounding process, according to the invention, which further simplifies the operational process by assigning predetermined keys of the keyboard 27 to separate rounding stages. In this example, there are provided four keys (1 . . . 4) for effecting the rounding stages. The program steps 123–126, which are associated with the keyboard actuation, are equivalent to steps 109, 111, 113 and 115 in the FIG. 3. The operational process of this embodiment has already been described in another example above.

While the invention has been described in connection with preferred embodiments, it will be understood that modifications thereof within the principles outlined above will be evident to those skilled in the art and thus the invention is not limited to the preferred embodiments but is intended to encompass such modifications.

We claim:

1. In an electronic taximeter having a microcomputer for computing a fare based on mileage and time and having a printer for printing a receipt listing the fare payable, the improvement comprising means responsive to operator input for selectively increasing the amount payable to one of a plurality of rounded-off values, and means for printing the selected rounded-off value on the receipt.

2. The electronic taximeter of claim 1, wherein the printer comprises keys actuable by the operator for selecting a rounded-off value.

3. The electronic taximeter of claim 2, wherein the same key is used for selecting, in response to the number of keypresses, any of the rounded-off values.

4. The electronic taximeter of claim 2, wherein multiple keys are used each for selecting only one of the rounded-off values.

5. An apparatus for increasing a fare, determined by a taxi microcomputer, to a rounded-off amount, for use in providing a passenger with a voucher printout, which also indicates additional payments to a taxi operator, wherein said apparatus comprises:

a voucher printout means including a voucher printing mechanism; and a means for transmitting the fare data determined by the taxi microcomputer to said voucher printout means;

wherein said voucher printout means further includes:

a microprocessor for controlling said voucher printout means and for increasing the fare to a rounded-off amount by a predetermined increasing amount;

a receiver having an input connected with said transmitting means and an output connected with said microprocessor for communicating the fare data to the microprocessor;

data entry means for inputting the predetermined amount into said microprocessor; and means connecting an output of said microprocessor with said voucher printing mechanism for communicating the rounded-off amount thereto for being printed on a voucher.

6. The apparatus of claim 5, wherein said data entry means comprises a keyboard having a plurality of manually actuated keys, and wherein the fare increases to a rounded-off amount is effected in response to a discrete selection of an increase of additional payment by actuation of at least one of said manually actuated keys.

7. The apparatus of claim 5, further comprising means for issuing two vouchers, wherein one voucher shows a fare and an amount corresponding to an additional payment in a separate printout, and wherein the second voucher shows exclusively the sum of all amounts comprising said fare along with any surcharge and any additional payments.

8. An apparatus for increasing a fare, determined by a taxi microcomputer, to a rounded-off amount, for use in providing a passenger with a voucher printout, which also indicates additional payments to a taxi operator, wherein said apparatus comprises:

a voucher printout means including a voucher printing mechanism; and a means for transmitting the fare data determined by the taxi microcomputer to said voucher printout means;

wherein said voucher printout means further includes:

a microprocessor for controlling said voucher printout means and for stepwise increasing the fare to a rounded-off amount by a manually selectable amount; and an input interface connected with said microprocessor and comprising a receiver connected with said transmitting means for communicating the fare data to said microprocessor, and an input keyboard for communicating the manually selectable amount to said microprocessor.

9. An apparatus for increasing a fare, determined by a taxi microcomputer, to a rounded-off amount, for use in providing a passenger with a voucher printout, which also indicates additional payments to a taxi operator, wherein said apparatus comprises:

a voucher printout means including a voucher printing mechanism; and a means for transmitting the fare data determined by the taxi microcomputer to said voucher printout means;

wherein said voucher printout means further includes:

a microprocessor for controlling said voucher printout means and for stepwise increasing the fare to a rounded-off amount by a manually selectable amount; and an input interface connected with said microprocessor and comprising a receiver connected with said transmitting means for communicating the fare data to said microprocessor, and an input keyboard for communicating the manually selectable amount to said microprocessor, wherein said input key board has selectable keys for increasing the manually selectable amount in predetermined steps.

10. An apparatus for increasing a fare, determined by a taxi microcomputer, to a rounded-off amount, for use in providing a passenger with a voucher printout, which also indicates additional payments to a taxi operator, wherein said apparatus comprises:

a voucher printout means including a voucher printing mechanism; and a means for transmitting the fare data determined by the taxi microcomputer to said voucher printout means, and wherein said voucher printout means further includes:

a microprocessor for controlling said voucher printout means and for stepwise increasing the fare to a rounded-off amount by a manually selectable amount, wherein said microprocessor is functionally a part of the taxi microcomputer; and an input interface connected with said microprocessor and comprising a receiver connected with said transmitting means for communicating the fare data to said microprocessor, and an input keyboard for communicating the manually selectable amount to said microprocessor.

11. An apparatus for increasing a fare, determined by a taxi microcomputer, to a rounded-off amount, for use in providing a passenger with a voucher printout, which also indicates additional payments to a taxi operator, wherein said apparatus comprises:

a voucher printout means including a voucher printing mechanism; and a means for transmitting the fare data, determined by the taxi microcomputer, to said voucher printout means;

wherein said voucher printout means further includes:

a microprocessor for controlling said voucher printout means and for stepwise increasing the fare to a rounded-off amount by a manually selectable amount; and an input interface connected with said microprocessor and comprising a receiver connected with said transmitting means for communicating the fare data to said microprocessor, and an input keyboard for communicating the manually selectable amount to said microprocessor, wherein said input keyboard has a single key for increasing the manually selectable amount in a differently stepped way.

12. An apparatus for increasing a fare, determined by a taxi microcomputer, to a rounded-off amount, for use in providing a passenger with a voucher printout, which also indicates additional payments to a taxi operator, wherein said apparatus comprises:

a voucher printout means including a voucher printing mechanism; and a means for transmitting the fare data, determined by the taxi microcomputer, to said voucher printout means;

wherein said voucher printout means further includes:

a microprocessor for controlling said voucher printout means and for stepwise increasing the fare to a rounded-off amount by a manually selectable amount; and an input interface connected with said microprocessor and comprising a receiver connected with said transmitting means for communicating the fare data to said microprocessor, and an input keyboard for communicating the manually selectable amount to said microprocessor, wherein said input keyboard has selectable keys for increasing the manually selectable amount in predetermined steps as a function of actuation of respective selectable keys.

13. An apparatus for increasing a fare, determined by a taxi microcomputer, to a rounded-off amount, for use in providing a passenger with a voucher printout, which also indicates additional payments to a taxi operator, wherein said apparatus comprises:

- a voucher printout means including a voucher printing mechanism; and
- a means for transmitting the fare data, determined by the taxi microcomputer, to said voucher printout means;

wherein said voucher printout means further includes:

- a microprocessor for controlling said voucher printout means and for stepwise increasing the fare to a rounded-off amount by a manually selectable amount; and
- an input interface connected with said microprocessor and comprising a receiver connected with said transmitting means for communicating the fare data to said microprocessor, and an input keyboard for communicating the manually selectable amount to said microprocessor, wherein said microprocessor applies a rounding-off function to a compound fare sum which represents a sum of a normal fare sum and one of a percentage and a fixed amount which is predetermined at a beginning of a taxi ride as an additional fare payable for an additional service.

14. An apparatus for increasing a fare, determined by a taxi microcomputer, to a rounded-off amount, for use in providing a passenger with a voucher printout, which also indicates additional payments to a taxi operator, wherein said apparatus comprises:

- a voucher printout means including a voucher printing mechanism; and
- a means for transmitting the fare data, determined by the taxi microcomputer, to said voucher printout means;

wherein said voucher printout means further includes:

- a microprocessor for controlling said voucher printout means and for stepwise increasing the fare to a rounded off amount by a predetermined increasing amount,
- a receiver having an input connected with said transmitting means and an output connected with said microprocessor for communicating the fare data to the microprocessor;
- data entry means for inputting the predetermined amount into said microprocessor; and
- means connecting an output of said microprocessor with said voucher printing mechanism for communicating the rounded-off amount thereto for being printed on a voucher.

15. The apparatus of claim 14, wherein the means for modifying a voucher printout are functionally components of said taxi microcomputer.

16. The apparatus of claim 14, wherein a selected increase of said rounded-off amount can be changed in a differently stepped way as a function of actuating an actuation element on said data entry means.

17. The apparatus of claim 14 wherein a rounding-off function is applied to a compound fare sum which represents a sum of a normal fare sum and one of a percentage and a fixed amount which is predetermined at a beginning of a taxi ride as an additional fare payable for an additional service.

18. The apparatus of claim 14, wherein the means for modifying a voucher printout functions in response to selected actuations of actuation elements of said data entry means.

19. The apparatus of claim 18, wherein a selected increase is a function of a duration of an actuation of an actuation element of said data entry means.

* * * * *